Oct. 18, 1966  J. L. ELLIS ET AL  3,279,049
METHOD FOR BONDING A SINTERED REFRACTORY CARBIDE BODY
TO A METALLIFEROUS SURFACE
Filed Dec. 5, 1963  2 Sheets-Sheet 1

INVENTORS:
JOHN L. ELLIS
STUART E. TARKAN
BY
ATTORNEYS

United States Patent Office 3,279,049
Patented Oct. 18, 1966

3,279,049
METHOD FOR BONDING A SINTERED REFRACTORY CARBIDE BODY TO A METALLIFEROUS SURFACE
John L. Ellis, White Plains, and Stuart E. Tarkan, Monsey, N.Y., assignors to Chromalloy Corporation, Nyack, N.Y., a corporation of New York
Filed Dec. 5, 1963, Ser. No. 328,224
12 Claims. (Cl. 29—472.7)

This invention relates to the bonding of a body of a composite metalliferous material to a body of metalliferous material and, in particular, to the bonding of bodies of refractory carbide composite materials, e.g. steel-bonded titanium carbide bodies, to each other or to bodies of metalliferous materials such as steel and articles thereof.

Refractory carbide hard metals are sintered products consisting in large part of carbides of tungsten, titanium and/or other refractory carbides cemented together by liquid phase sintering using a matrix metal, such as cobalt, as the bonding materials. The favorable properties of these hard metals are due in large part to the rather high hardness of the carbides combined with the strengthening effect of the bonding metal.

In recent years a machinable refractory carbide body comprising titanium carbide grains dispersed through a heat treatable steel matrix has been developed which utilizes the intrinsic hardening effect of the carbide combined with the hardenability of the steel matrix. The machinable carbide body has one advantage over conventional cemeted carbides in that the matrix can be softened by annealing so as to lower the gross hardness of the composition to say 40 $R_C$, such that the body can be machined to a desired shape and then hardened to upwards of 72 $R_C$ by quenching the alloy from an elevated temperature similarly as is done with certain alloy tool steels.

In producing refractory carbide bodies of the foregoing types, powder metallurgy is generally employed. The method usually comprises mixing refractory carbide particles with finely divided matrix-forming bonding metal, compacting the mixture into a desired shape in a mold, and then subjecting the resulting compact to liquid phase sintering by heating it to a temperature above the lowest melting phase of the matrix metal but below the melting point of the refractory carbide. Liquid phase sintering is preferred as dense products are assured substantially free from porosity.

However, one of the limitations of liquid phase sintering is the geometry of the shape and its size. It is not very economical to produce large sizes by this method because of the tendency towards slumpage in the case of large cylinders, or warpage in the case of large asymmetrical shapes. In producing large shapes, large dies are necessary which require rather high pressure to obtain effective and uniform compression of the powder mixture. In the case of intricate shapes, the die cost would be prohibitive, particularly where the number of parts to be produced would not be sufficient to amortize the die.

It would be desirable, therefore, to provide a method of producing a variety of shapes of sintered refractory carbide bodies without requiring the use of special dies or complicated tooling or machining operations.

It is thus an object of the invention to provide a method of producing a variety of shapes and sizes of sintered refractory carbide bodies.

Another object is to provide a method of constructing unitary structures of a variety of shapes by joining units of refractory carbide bodies with each other or with bodies of other metalliferous materials, such as steel and other metals and alloys.

A further object is to provide a method for bonding refractory carbide bodies with each other or with other metals without substantially adversely affecting the composition of the material at the bonding interface.

These and other objects will clearly appear when taken in conjunction with the following disclosure and the accompanying drawing, wherein.

Stating it broadly, we provide a method of producing shapes varying in geometry and size from bodies of composite material comprising grains or particles of a high melting component dispersed through a matrix metal of lower melting point. We find that we can bond such bodies to each other or other metalliferous materials to form any desired configuration without resorting to the use of a brazing material or bonding agent foreign to the materials being joined. The method essentially comprises forming relatively smooth mating surfaces on each of two or more bodies to be joined, placing one of the bodies on top of the other in contact at their mating surfaces, and heating the bodies in a vacuum at an elevated temperature at least equal to the fusion point of the lowest melting phase of the matrix metal of one of said composite metal bodies.

We find the foregoing method particularly adapted for the joining together of shapes made from steel-bonded titanium carbide, particularly bodies containing 40% by weight of TiC and 60% by weight of steel-forming ingredients. As one example of producing the bodies to be joined, 1000 grams of TiC of about 5 to 7 microns in size are mixed in a steel mill with 1500 grams of steel-forming ingredients comprising carbonyl iron powder of 20 microns average size and 0.80% carbon, the powdered ingredients containing 1 gram of paraffin wax for each 1000 grams of mix. The milling is conducted for about 40 hours with the mill half full with stainless steel balls, using hexane as the vehicle.

After completion of the milling, the mix is removed and vacuum dried. A proportion of the mixed product is compressed in a die at 15 tons/sq. in. to form a round 1.5 inches in diameter and about 1.4 inches high. Another round of the same diameter is produced having a height of 1.2 inches. The two rounds are liquid phase sintered at a temperature of about 1435° C. for one-half hour at a vacuum corresponding to 20 microns of mercury or better. After completion of sintering, the assembly is cooled and then annealed by heating to 900° C. for 2 hours followed by cooling at a rate of about 15° C./hour to about 100° C. to produce an annealed microstructure containing spheroidite.

Smooth mating faces are then ground on a flat face of each of the rounds using a surface grinder equipped with a 46 grit grinding wheel. The rounds are placed one on top of the other with their mating faces in contact and subjected to bonding at a temperature of about 50° C. below the original sintering temperature of the bodies, that is at 1385° C. for 30 minutes in a vacuum, preferably below 10 microns of mercury. This temperature is above the lowest melting phase of the matrix metal, the lowest melting phase being a eutectic formed from a portion of the matrix metal reacting with a portion of titanium carbide. Under the foregoing conditions a strong bond is obtained.

Figure 10:
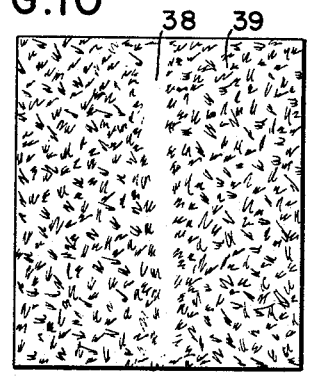
FIG. 10 is a representation of a micrograph at 86 times magnification showing the bonding zone that obtains when a smooth face of a steel-bonded titanium carbide body is bonded to a smooth face of another steel-bonded titanium carbide body.

The mechanism by which the bonding is achieved is not clearly understood. Where the mating faces are produced by grinding, it appears that the bonding zone is comprised substantially of the matrix metal. This will be apparent from FIGS. 10 and 11 of the drawing. Referring to FIG. 10, a representation of a micrograph (about 86 times magnification) is depicted of a pair of steel-bonded titanium carbide bodies bonded together along zone 38 comprised substantially of the matrix metal, the field on each side of the bonding zone comprising particles 39 of titanium carbide dispersed substantially uniformly through the steel matrix. The thickness of the bonding produced from binder-rich compositions by conventional zone is generally about 0.001 to 0.0015 inch.

Figure 11:
FIG. 11 depicts a bonded test specimen subjected to transverse rupture showing failure occurring to one side of the bonding zone.

One of the advantages of this type of self-bonding is that the bond is stronger than the body of material bonded. This is illustrated in FIG. 11 which shows two body portions of sintered steel-bonded titanium carbide 39 joined at 40 to form a bonded test piece in accordance with the invention. However, when the test piece was subjected to transverse rupture with the breaking load applied directly on the bonding zone 40, it ruptured through the composite material itself at 41 to one side of the bonding zone.

As has been stated hereinbefore, shapes of fairly large sizes can be produced by the invention. Illustrative of one shape is a hollow cylinder of about 5 inches outside diameter, 2 inches inside diameter and about 4.5 inches high. Generally, cylinders of that height are difficult to produce from binder-rich compositions by conventional pressing and sintering methods without markedly slumping. Two hollow sintered bodies are first produced of 5 inches O.D., 2 inches I.D. and about 2.3 inches high. In producing these bodies, a powder mixture of titanium carbide and steel-forming ingredients is formed, the mixture compacted in a steel die and the compacted mixture liquid phase sintered at a temperature of about 1435° C. for about 30 minutes under a vacuum of less than 20 microns of mercury, the time to reach the sintering temperature taking several hours.

After having produced the two hollow bodies, smooth mating faces are produced on each by grinding with an aluminum oxide wheel having a 46 grit, a soft open structure, and a vitrified bond.

The hollow cylinders are then concentrically placed one on top of the other at their mating faces and subjected to heating in a vacuum at 1385° C. for about 30 minutes, the time to reach the temperature taking about several hours. The temperature is preferably about 50° C. below the original sintering temperature of the bodies. Broadly speaking, however, the temperature should be at least equal to the fusion point of the lowest melting phase in the matrix metal.

Figure 1:
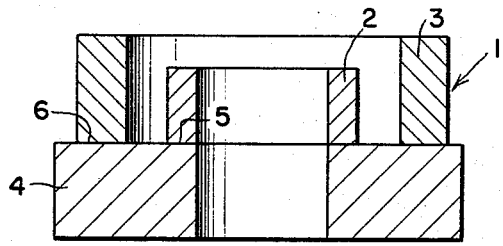
FIGS. 1 to 9 are illustrative of various shapes that can be produced in accordance with the invention.

Examples of the various kinds of shapes that can be produced by the invention are shown in FIG. 1 to FIG. 9. Referring to FIG. 1, a hollow shape 1 is shown comprising inner and outer rings 2 and 3, respectively, of sintered refractory carbide, for example steel-bonded titanium carbide, concentrically bonded to a hollow, cylindrical metalliferous backing member 4 of the same sintered material or of steel, such as mild steel, depending on the ultimate use of the shape. The rings 2, 3 are bonded to backing member 4 at interface 5 for inner ring 2 or interface 6 for outer ring 3. Had such a part been produced by conventional pressing and sintering methods, the die cost would be economically prohibitive. The advantages of this type of bonding over brazing are that the body can be heated to elevated temperatures (e.g. quenching temperatures) at which conventional brazes normally melt. Other advantages of the invention are: (1) no foreign substance is introduced into the bonded area which could adversely affect the chemical and physical properties of the steel-bonded carbide or the steel in the adjacent area; (2) any possibility of a galvanic reaction across the interface in certain environments is greatly inhibited; (3) the bonding zone is extremely thin, thus minimizing selective wearing of the surface at the zone which might otherwise occur using conventional bonding methods, such as brazing; (4) that except for the very thin bonding zone, the resulting bonded body is for all intents and purposes monolithic in character; and (5) an intimate contact of the bodies is obtained uniformly over a relatively large area which is difficult to obtain by brazing.

Figure 2:
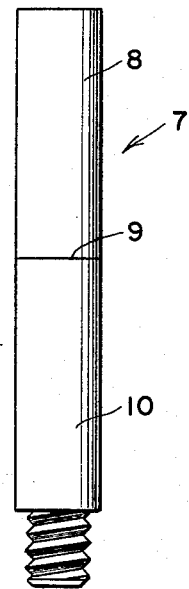

Another use of the invention is in the production of the article illustrated in FIG. 2 which shows a cylindrical piercing mandrel blank 7 comprising a sintered refractory carbide portion 8 bonded at 9 in accordance with the invention to a threaded steel shank 10. Tool steel mandrels used in the hot piercing of metal are subjected to high work piece temperatures and to considerable compression stresses and tend with use to mushroom at the piercing end. Since sintered refractory carbides exhibit a rather high resistance to softening at elevated working temperatures, a mandrel of this construction minimizes the mushrooming problem.

Figure 3:
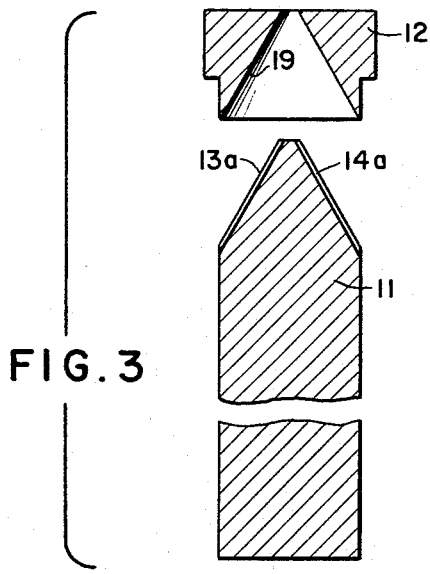
Figure 5:
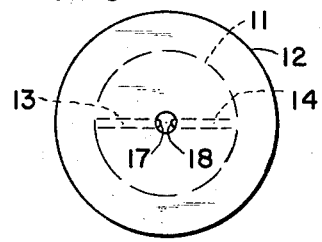
Figure 4:
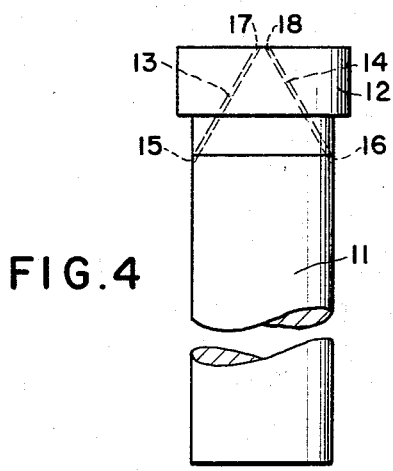

As an example of a complex shape very difficult of production by conventional compacting and sintering methods, reference is made to FIGS. 3 to 5 which show a nozzle wholly made of a sintered refractory carbide material, for example steel bonded titanium carbide. The requirements for the nozzle were that it had to be resistant to erosion by high pressure oil.

Referring to FIGS. 4 and 5, the nozzle, which is cylindrical in shape, is shown comprising a main body portion 11 having a flanged end 12 of larger diameter. Two inclined orifices 13 and 14 adapted for receiving high pressure hydraulic fluid are disposed at the forward end of the nozzle, the orifices beginning at 17 and 18 at the flanged end terminating at 15 and 16, respectively, at the sides of the main body. The orifices having a diameter about 0.009 inch are difficult to produce by drilling because of the hardness of the material. However, the method of the invention is particularly adapted to produce this part by the novel bonding technique.

Referring now to FIG. 3, a cross-section of the nozzle in two separate sections is shown. The forward or flange end 12 is produced as a cylinder blank by normal powder pressing procedures. The cylinder blank is sintered as stated above and the sintered blank then machined to obtain the shape shown, including conical surface 19, which surface is machined smooth to match with the machined conical surface of body portion 11. A ceramic plate together with a supporting fixture is employed to hold the fitted parts shown in FIG. 4 vertically for the bonding treatment.

In producing the main body portion 11, it is machined from a solid sintered round with the 0.009 inch grooves ground in.

Figure 6:
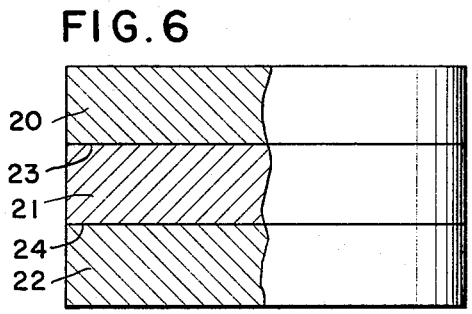

Examples of large cylindrical shapes are shown in FIGS. 6 to 9. In FIG. 6, a cylindrical shape of about 8 inches O.D. may be produced having a height of about 6 to 8 inches by bonding together three cylindrical pieces 20, 21, 22 at their mating faces 23 and 24.

Figure 7:
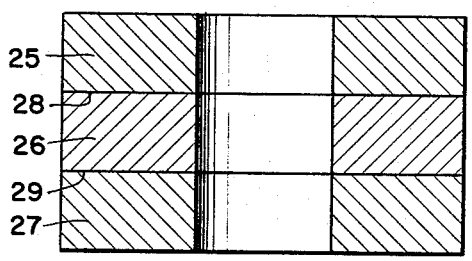

FIG. 7 depicts a large hollow cylinder of about 6 inches O.D., one inch I.D. and 4 inches high produced from three pieces 25, 26, 27 bonded together concentrically at mating faces 28 and 29.

Figure 9:
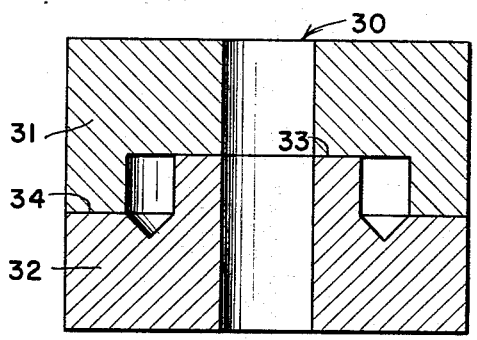

A complicated hollow cylindrical shape 30 having an annular passageway therein is shown in FIG. 9 comprising two pieces of sintered and machined steel-bonded titanium carbide 31 and 32 joined together at annular mating faces 33 and 34. This technique would be particularly useful in producing water-coolable dies.

Figure 8:
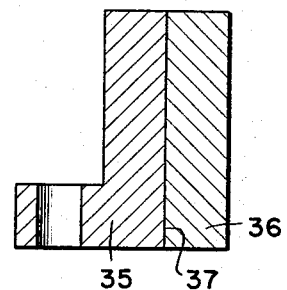

Certain machine parts require a wear resistant surface. Referring to FIG. 8 a machine element 35 of mild steel is shown in cross section having bonded thereto at 37 in accordance with the invention a sintered refractory carbide 36.

Unlike other methods of diffusion bonding, applied pressure is not required to effect a sound weld, other than the normal pressure arising from the force of gravity acting on the bodies in contact. Thus, complicated fixtures are not required in producing a sound weld.

As stated above, so long as the heating is conducted at a temperature at least equal to the temperature of the lowest melting phase but preferably not exceeding the sintering temperature of the body, an adequate bond will obtain. We desire, in order to avoid slumping, that the bonding temperature not exceed about 50° C. below the original sintering temperature of the bodies.

In order to minimize the line of demarcation at the bonded interface while at the same time minimize any variation in composition across the bonding zone, we have found that this can be done by modifying slightly the method of the invention.

Figure 12:
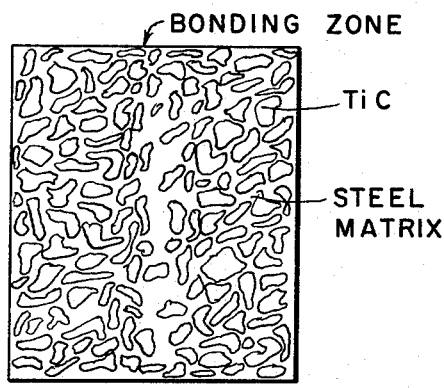
FIG. 12 is a representation of a micrograph at 1000 times magnification illustrating a diffusion bond with practically no line of demarcation.

For example, one method comprises sand blasting the mating faces with coarse alumina powder. Apparently, the microscopic interstices near the surface containing the matrix metal are eroded away leaving microscopic peaks of TiC crystals surrounded by microscopic voids, while retaining mating relationship between the two surfaces. After completion of the sand blasting, the two faces are contacted and subjected to vacuum bonding at 1385° C. for about 30 minutes at a vacuum not exceeding 6 microns, that is about 50° C. below the sintering temperature. With this method, the metallographic structure of the bonding zone is hardly distinguishable from the structure of the parent metal. At 30 times magnification, the bonding zone was not visible at all. The substantially uniform metallographic structure will be apparent from FIG. 12 which is a representation of a micrograph at a magnification of about 1000 times. It will be noted that even at the foregoing magnification, the bonding zone is hardly discernible.

Still another method which has given good results comprises sprinkling finely divided particles of the parent metal composition at the interface prior to bonding. Thus, where the bodies being joined have a composition of about 40% by weight of TiC and 60% steel, particles of the foregoing composition are uniformly spread on one of the surfaces and the surface of the other body mated with it. After bonding for 30 minutes at 1385° C., the bonding zone was hardly discernible at 160 times magnification.

In another method similar to the foregoing, particles of TiC are uniformly sprinkled across one of the mating surfaces and the bonding of the two mating surfaces effected in vacuum at 1385° C. for about 30 minutes. However, of the three methods discussed hereinabove, we prefer to use the method in which the mating surfaces are grit or sand blasted prior to bonding.

Examples of sintered refractory carbide bodies that may be bonded to each other, or to a metalliferous body such as steel, are sintered tungsten carbide bodies containing 5 to 30% of bonding metal, such as cobalt, nickel, and the like; sintered multi-carbides such as multi-carbides of tungsten carbide, tantalum carbide and titanium carbide containing bonding metal as aforesaid; steel-bonded titanium carbide in which the amount of steel matrix varies by weight from 30% to 80%. The steel compositions may comprise low carbon, and high carbon steel, low alloy and high steels, e.g. 18–4–1 tool steel, or even stainless steel, such as type 302, type 304, 403, 440C, etc. A tungsten carbide-titanium carbide grade comprising a saturated solid solution of WC-TiC particles dispersed through a high alloy tool steel, such as an 18–4–1 composition, may likewise be treated in accordance with the invention.

The preparation of the surface of the sintered refractory carbide is important insofar as producing mating bonding faces is concerned. For example, a lathe turned surface having approximately a 32 micro-inch finish or grinding with a 46 grit wheel have been found satisfactory. Any method which will produce mating faces may be used.

Examples of other metalliferous materials besides steel to which sintered refractory carbide bodies can be bonded are nickel or nickel alloys, cobalt or cobalt alloys or beryllium which has a relatively close match in coefficient of thermal expansion. The term "metalliferous material" as employed herein is meant to include such bondable metals or alloys as sintered refractory carbides, steels, non-ferrous alloys, heat resisting alloys, and others.

Examples of articles of manufacture that may be produced in accordance with the invention are bearing sleeves having a diameter of 2½ inches, a length of 4 inches and a wall thickness of ⅛ inch, forming dies having a 4" O.D. by 4¼ long with a contoured internal shape, hydraulic fluid control receiver about ¼" diameter, 2" long with two converging holes .009 inch diameter, and the like.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of bonding a body of composite material comprising particles of a high melting component dispersed through a ductile matrix metal of lower melting point to a body of a metalliferous material which comprises, forming substantially accurate mating surfaces on each of said bodies, the surface of said composite material having a different concentration of high melting component relative to the matrix metal as a result of the preparation of said surface, placing one of said bodies on top of the other in contact at their mating surfaces, heating said bodies in a vacuum at an elevated temperature at least equal to the fusion point of the lowest melting phase of the matrix metal of said composite material for a time sufficient to effect fusion of the matrix metal, and then cooling to form said bond.

2. A method of bonding a body of refractory carbide alloy comprising particles of a high melting refractory carbide dispersed through a ductile matrix metal of lower melting point to a body of a metalliferous material which comprises, forming substantially accurate mating surfaces on each of said bodies, the surface of said composite material having a different concentration of high melting component relative to the matrix metal as a result of the preparation of said surface, placing one of said bodies on top of the other in contact at their mating surfaces, heating said bodies in a vacuum at an elevated temperature at least equal to the fusion point of the lowest melting phase of the matrix metal of said composite material for a time sufficient to effect fusion, and then cooling said bodies to room temperature, whereby to produce a strongly bonded joint at the interface of the bodies.

3. The method of claim 2 wherein prior to placing one of said bodies on top of the other, each of said mating surfaces is sand blasted.

4. The method of claim 2 wherein prior to placing one of said bodies on top of the other, a layer of finely divided refractory carbide alloy composition is spread over one of said surfaces.

5. The method of claim 2 wherein prior to placing one of said bodies on top of the other, a layer of finely divided refractory carbide powder is spread over one of the surfaces.

6. A method of bonding a body of sintered refractory carbide composite material comprising particles of titanium carbide dispersed through a steel matrix to a body of metalliferous material which comprises, mechanically preparing substantially accurate mating surfaces on each of said bodies, placing one of said bodies on top of the other in contact at their mating surfaces, heating said bodies in a vacuum at an elevated temperature at least equal to the fusion point of the lowest melting phase of the steel matrix of said composite material but not exceeding the liquid phase sintering temperature of the refractory carbide material for a time sufficient to effect fusion, and then cooling said bodies to room temperature, whereby to produce a strongly bonded joint at the interface of the bodies.

7. A method of bonding a body of sintered refractory carbide alloy comprising particles of a high melting refractory carbide dispersed through a relatively ductile matrix metal of lower melting point to another sintered body of refractory carbide alloy of substantially the same composition which comprises, mechanically preparing substantially accurate mating surfaces on each of said bodies, placing one of said bodies on top of the other in contact at their mating surfaces and heating said bodies in a vacuum at an elevated temperature at least equal to the fusion point of the lowest melting phase of the matrix metal of said composite material but not exceeding the liquid phase sintering temperature of the refractory carbide alloy for a time sufficient to effect fusion, and then cooling said bodies to room temperature, whereby to produce a strongly bonded joint at the interface of the bodies.

8. The method of claim 7 wherein the refractory carbide alloy is titanium carbide dispersed through a steel matrix.

9. The method of claim 7 wherein the refractory carbide is a multi-carbide containing titanium carbide and the matrix comprises a steel composition.

10. The method of claim 8 wherein prior to placing one of said bodies on top of the other, each of said mating surfaces is sand blasted.

11. The method of claim 8 wherein prior to placing one of said bodies on top of the other, a layer of the finely divided titanium carbide alloy composition is spread over one of said surfaces.

12. The method of claim 8 wherein prior to placing one of said bodies on top of the other, a layer of finely divided titanium carbide powder is spread over one of the surfaces.

References Cited by the Examiner
UNITED STATES PATENTS

| | | | |
|---|---|---|---|
| 2,184,847 | 12/1939 | Pearson | 29—486 |
| 2,743,201 | 4/1956 | Johnson et al. | |
| 3,025,592 | 3/1962 | Fischer et al. | 29—194 |
| 3,082,521 | 3/1963 | Cohen | 29—498 XR |
| 3,110,571 | 11/1963 | Alexander | 29—195 |
| 3,137,937 | 6/1964 | Cowan et al. | 20—486 |

JOHN F. CAMPBELL, *Primary Examiner.*

WHITMORE A. WILTZ, P. M. COHEN,
*Assistant Examiners.*